United States Patent [19]

Inoue

[11] 4,263,116

[45] Apr. 21, 1981

[54] ELECTRODE HOLDER-GUIDANCE ASSEMBLY FOR WIRE-CUT ELECTRICAL MACHINING

[75] Inventor: Kiyoshi Inoue, Tokyo, Japan

[73] Assignee: Inoue-Japax Research Incorporated, Kanagawa, Japan

[21] Appl. No.: 115,390

[22] Filed: Jan. 25, 1980

[51] Int. Cl.³ .................. B23P 1/12; B23P 1/02; B23K 28/00
[52] U.S. Cl. .................. 204/224 M; 204/225; 204/297 R; 219/69 W
[58] Field of Search .................. 204/224 M, 206, 225, 204/297 R; 219/69 W

[56] References Cited

U.S. PATENT DOCUMENTS

| | | | |
|---|---|---|---|
| 2,802,929 | 8/1957 | Fefer et al. | 219/69 W |
| 2,974,216 | 3/1961 | Inoue | 219/69 W |
| 3,642,601 | 2/1972 | Kondo | 204/224 M X |
| 3,928,163 | 12/1975 | Ullmann et al. | 204/224 M X |
| 4,193,852 | 3/1980 | Inoue | 204/224 M X |

FOREIGN PATENT DOCUMENTS 471986  9/1975  U.S.S.R. .................. 204/224 M

*Primary Examiner*—Howard S. Williams
*Assistant Examiner*—D. R. Valentine
*Attorney, Agent, or Firm*—Karl F. Ross

[57] ABSTRACT

An improved wire-electrode support and guidance assembly for electrical machining comprise a first wheel rotatable about a first axis and formed along its periphery with a continuous annular recess of a uniform depth and adapted to receive and retain therein a continuous wire electrode which is axially advanced and transported from a supply reel to a collection reel through the region of a workpiece. The assembly includes a second wheel rotatable about a second axis parallel to the aforesaid first axis and having a flange of a profile substantially complementary to that of the aforesaid recess, and includes means for urging the first and second axes relatively towards each other to drive the flange of the second wheel into a mating engagement with the recess of the first wheel so that the wire electrode when passed through the recess is squeezed surfaces of the recess and the flange.

6 Claims, 2 Drawing Figures

ELECTRODE HOLDER-GUIDANCE ASSEMBLY FOR WIRE-CUT ELECTRICAL MACHINING

FIELD OF THE INVENTION

The present invention relates to Wire-Cut (WC) electrical machining (generally referred to as EM, including EDM, ECM and ECDM) and, more particularly, to a wire-electrode support and guidance assembly for WC-EM.

BACKGROUND OF THE INVENTION

Wire-cut electrical discharge or electrical machining makes use of a continuous wire electrode of a thickness in the range between 0.05 and 0.5 mm which is axially advanced and transported from a supply side through a machining zone to a take-up side. In the machining zone there is positioned a workpiece and an EDM gap is formed between the advancing wire electrode and the workpiece. A machining fluid, typically distilled water of dielectric nature or a liquid electrolyte, is supplied to fill and flush the EDM gap while an electric current is applied between the wire electrode and the workpiece to create a succession of electrical discharges or a strong electrolytic action through the fluid medium, thereby allowing material to be removed from the workpiece. As material removal proceeds, the workpiece is displaced relative to the advancing electrode and generally transversely to the axial direction thereof along a prescribed path to form a desired cut in the workpiece.

In the path of wire travel, drive rollers driven by a motor are provided immediately upstream of the take-up side to apply a traction force to the wire to feed it at a predetermined rate of advancement. Brake rollers driven by a motor may further be provided immediately downstream of the supply side to assure that the wire travels stretched under a suitable tension along the path, which also includes a pair of guide members constituted by smooth arcuate bearing surfaces designed to change the direction of wire travel from the supply side to the machining zone and from the latter to the take-up side, respectively. These guide members may also serve as wire-positioning guides which precisely align the traveling wire in a predetermined machining position across the workpiece.

The structure of a wire-positioning guidance member therefore directly influences the machining accuracy which results.

Heretofore, two forms of the wire passage in the wire guidance and support assembly have been in use. One makes use of an internal passage formed through an elongated solid member. Such structures do not, however, allow easy mounting and dismounting of the continuous wire. In the other form, a V-shaped slot on a fixed guide body provides a bearing surface for the traveling wire but this tends to cause the traveling wire to come off, thereby giving rise to machining inaccuracy.

OBJECT OF THE INVENTION

It is a principal object of the present invention to provide an improved wire-electrode support and guidance assembly for WC-EDM, or WC-ECM, which overcomes the aforementioned difficulties and inconvenience encountered with the prior art.

SUMMARY OF THE INVENTION

In accordance with the present invention there is provided a wire-electrode support and guidance assembly for electrical machining wherein a continuous wire electrode is axially advanced and transported from a supply side to a collection side through the region of a workpiece and an electric current is passed between the advancing electrode and the workpiece through a fluid-filled machining gap to electrically remove material from the workpiece. The assembly comprises: a first wheel rotatable about a first axis and formed along its periphery with an annular recess of a uniform depth and adapted to receive and retain the wire electrode therein; a second wheel rotatable about a second axis parallel to the first axis and formed with a flange of a profile substantially complementary to that of the recess; and means for urging the first and second axes relatively towards each other to drive the flange of the second wheel into a mating engagement with the recess of the first wheel so that the wire electrode when passed through the recess is squeezed between the walls of the recess and the flange.

SPECIFIC DESCRIPTION

Figure 1:
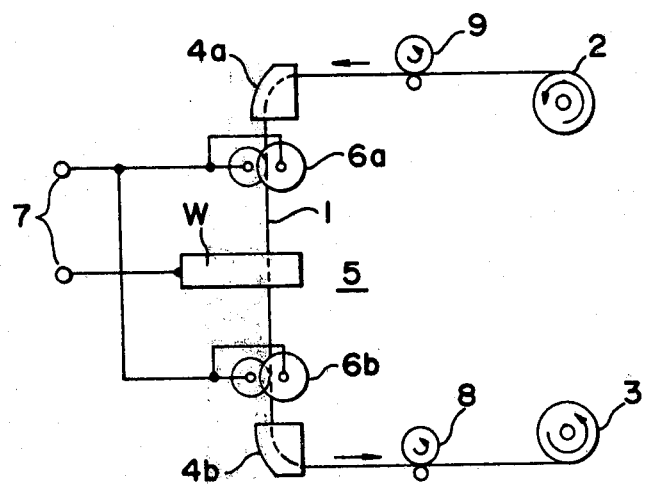
FIG. 1 is a schematic elevational view diagrammatically illustrating a WC-EM system incorporating a pair of assemblies in accordance with the present invention.

Referring to FIG. 1, a continuous wire electrode 1 is shown advanced axially and transported from a supply side 2 shown in the form of a supply drum to a collection side 3 shown in the form of a take-up drum. In the path of wire electrode 1 there are provided a pair of fixed guide members 4a and 4b designed to change the direction of wire travel from the supply side 2 to a machining zone 5 and from the latter to the take-up side 3. In the machining zone 5 there is juxtaposed a workpiece W with the traveling wire electrode 1 to form a machining gap therebetween. A machining fluid, e.g. distilled water or other liquid of dielectric nature (i.e. EDM fluid) or liquid electrolyte of a suitable conductivity (i.e. ECM fluid), is introduced into the machining zone 5.

Across the machining zone and between the fixed guide members 4a and 4b, which may be of any conventional design, there are provided wire electrode guidance and holder members 6a and 6b each constructed in accordance with the present invention. The function of the members 6a and 6b is to prevent the traveling wire 1 from fluctuation thereby holding it precisely in a desired position across the machining zone 5 and here also to conduct the machining current. An electrical machining power supply 7 thus has its one output terminal connected to these members 6a and 6b and its other output terminal connected to the workpiece to conduct the machining current between the latter and the wire electrode 1 through the machining gap. The material removal from the workpiece W takes place by EDM or ECM action depending upon the nature of machining liquid used and the nature of machining current applied.

As machining proceeds, the workpiece W is carried by a table (not shown) and displaced relative to the traveling wire electrode 1 along a prescribed path so that a desired machining cut corresponding to the displacement path is produced in the workpiece W.

Shown also in the travel path are drive rollers 8 driven by a motor (not shown) and provided immediately upstream of the take-up side 3 to produce continuous or successive advancement and transportation of the wire electrode 1 and brake rollers 9 driven by a motor (not shown) and provided immediately downstream of the supply side 2. The drive rollers 8 and brake rollers 9 provide a predetermined rate of travel and a predetermined tension applied to the wire electrode 1.

Figure 2:
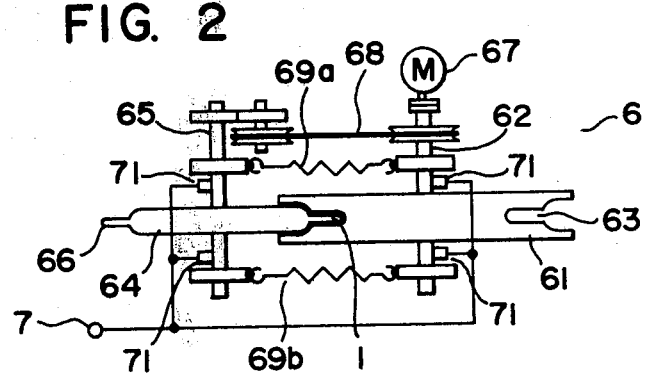
FIG. 2 is an enlarged schematic plan view of the wire-electrode holder and guidance assembly of FIG. 1.

In FIG. 2 there is shown in an enlarged plan view each of the wire holder and guidance assemblies 6a and 6b shown in FIG. 1. The assembly 6 thus includes a first wheel 61 for rotation about a shaft 62 and formed along its periphery with an annular recess 63 of a uniform depth and adapted to receive and retain the wire electrode 1 therein. A second wheel 64 is rotatable about a shaft 65 and is formed with a flange 66 having a profile complementary to that of the first wheel 61. The shafts 61 and 65 extend in parallel with each other and the wheels 61 and 64 lie in a common plane including the wire electrode 1 which transverses the plane of FIG. 2 from the front side towards the rear. With the wire electrode stretched between the fixed guides 4a and 4b having been received in the recess 63 of the wheel 61 confronting the wheel 64, the shaft 62 carrying the first wheel 61 is urged towards the shaft 65 carrying the wheel 64 or vice versa to drive the flange 66 into a mating engagement with the recess 63 so that the wire electrode 1 is squeezed between them as shown.

As shown the recess 63 is preferably graduated in section so that the outer region is greater in width than the inner region. This structure allows the wire 1 to be readily inserted in the recess 63 and readily removed therefrom.

The shaft 62 is rotated by a motor 67. A belt arrangement 68 couples the shaft 62 with the shaft 65 so that the first wheel 61 and second wheel 64 are driven in opposite directions to guide the wire electrode 1 as sandwiched therebetween. The shafts 62 and 65 are also coupled together by springs 69a and 69b which serve to resiliently support the wheels 61 and 64. Also connected to the shafts 62 and 65 are current-conducting brushes 71 which are tied to one terminal of an electrical machining power supply of which the other terminal is connected to the workpiece W.

It will be appreciated that the invention provides a substantially improved support and guidance structure for the traveling wire electrical machining electrode. Unlike the conventional V-groove structure in which the wire electrode tends to run out of the guiding surfaces, it is capable of holding the wire electrode with consistency and stability while preventing it from fluctuation or vibration. The squeezing is effected resiliently so that against a possible variation of wire size or a possible vibration the wire may be held and guided with stability and smoothly without difficulty. The wire positioning is accomplished on a structure in which two wheels are separated; the wire can be mounted and dismounted extremely easily unlike the conventional die-type support and guidance structure. It is extremely suitable for handling when, for example, the wire electrode is occasionally broken, thus requiring repositioning. Furthermore, one or both of wheels can also be used advantageously as a machining current conductor to allow stabilized current conduction. Since the assembly can act on the traveling wire without undue or excessive urging force the possibility of wire breakage is markedly reduced.

What is claimed is:

1. In a wire-electrode holder and guidance assembly for electrical machining wherein a continuous wire electrode is axially advanced and transported from a supply side to a collection side through the region of a workpiece and an electric current is passed between the advancing electrode and the workpiece through a fluid-filled machining gap to electrically remove material from the workpiece, an improvement comprising:

a first wheel rotatable about a first axis and formed along its periphery with an annular recess of a uniform depth and adapted to receive and retain the wire electrode therein; a second wheel rotatable about a second axis parallel to said first axis and formed with a flange of a profile substantially complementary to that of said recess; and means for urging said first and second axes relatively towards each other to drive said flange of second wheel into a mating engagement with said recess of first wheel so that said wire electrode when passed through said recess is squeezed between surfaces of the recess and said flange.

2. In an electrical machining apparatus, in combination:

a source of an elongated wire electrode adapted to be withdrawn from said source;

a pair of electrode guides flanking a location at which a workpiece can be positioned for electrical machining by said electrode in the presence of a machining liquid, each of said electrode guides comprising a pair of coplanar wheels, a first of the wheels of each pair being formed with a peripheral recess receiving said wire electrode, the second wheel of each pair penetrating into said recess;

means for urging the wheels of each pair toward one another to press said wire electrode into the respective recesses;

takeup means receiving the wire electrode after the wire electrode has traversed said guides; and means for connecting at least one of said guides to an electrical-machining current source.

3. The combination defined in claim 2 wherein the first wheel of each pair is formed adjacent the periphery with a relatively wide portion of the respective recess and inwardly of said wide portion, a relatively narrow portion of the respective recess, the second wheel of each pair being formed with a narrow flange, complementary to and projecting into the narrow portion of the respective recess to press the wire electrode against surfaces of the narrow portion at the bottom therof.

4. The combination defined in claim 2 wherein the means for urging the wheel of each pair toward one another includes a pair of springs flanking each pair of wheels and acting upon respective shafts coupled with said wheels.

5. The combination defined in claim 2, claim 3 or claim 4 wherein the means for connecting at least one of said guides to an electrical machining source includes at least one brush contacting a shaft for at least one of the wheels of at least one of said pairs.

6. The combination defined in claim 5 wherein the means for connecting at least one of said guides to said electrical machining current source includes a pair of brushes flanking each wheel and bearing upon a shaft connected to the respective wheel, all of said brushes being connected in parallel to said source.

* * * * *